United States Patent [19]

Campbell et al.

[11] Patent Number: 4,591,607

[45] Date of Patent: May 27, 1986

[54] GRAFT COPOLYMERS OF PARA-METHYLSTYRENE ON POLYOLS AND POLYURETHANES PREPARED THEREFROM

[75] Inventors: Gregory A. Campbell, Stockton, N.J.; Carl G. Seefried, Jr., Southbury, Conn.

[73] Assignee: Mobil Oil Corporation, New York, N.Y.

[21] Appl. No.: 685,585

[22] Filed: Dec. 24, 1984

[51] Int. Cl.[4] .................. C08G 18/14; C08G 18/63; C08K 5/06
[52] U.S. Cl. .................. 521/137; 252/182; 524/377; 524/762; 528/75
[58] Field of Search .......... 521/137; 528/75; 252/182; 524/377, 762

[56] References Cited

U.S. PATENT DOCUMENTS

| | | | |
|---|---|---|---|
| 4,210,727 | 7/1980 | Preston et al. | 521/137 |
| 4,225,403 | 9/1980 | Arbit | 204/159.14 |
| 4,230,836 | 10/1980 | Canterino | 525/332 |
| 4,242,249 | 12/1980 | Van Cleve et al. | 260/33.2 R |
| 4,242,465 | 12/1980 | Canterino | 521/88 |
| 4,281,083 | 8/1980 | Arbit | 525/305 |
| 4,388,440 | 8/1980 | Murray | 525/49 |
| 4,397,988 | 8/1983 | Sherman | 525/98 |

*Primary Examiner*—Herbert S. Cockeram
*Attorney, Agent, or Firm*—Alexander J. McKillop; Michael G. Gilman; Edward J. Trojnar

[57] ABSTRACT

Para-methylstyrene is polymerized under free-radical conditions in the presence of a polyol to give grafted polymeric polyols which are suitable for use in the production of polyurethane foams.

6 Claims, No Drawings

GRAFT COPOLYMERS OF PARA-METHYLSTYRENE ON POLYOLS AND POLYURETHANES PREPARED THEREFROM

BACKGROUND OF THE INVENTION

Graft copolymer dispersions prepared from vinyl monomers and polyether polyols, and their use in the preparation of polyurethane polymers are well known as described in U.S. Pat. Nos. 3,383,351 to Stamberger and 3,652,639 to Pizzini et al. In the earlier patent, the polyols employed are essentially free from ethylenic unsaturation. The polyols employed by Pizzini et al contained at least about one mole of unsaturation per mole of polyol. In accordance with this invention a variety of polyols can be used in conjunction with para-methylstyrene.

SUMMARY OF THE INVENTION

This invention relates to reactive polymer polyols, suitable for the preparation of polyurethanes, made by the free-radical polymerization of para-methylstyrene in the presence of a polyol.

DETAILED DESCRIPTION OF THE INVENTION

The essential components of the polymeric polyols in accordance with this invention are para-methylstyrene and a polyol. Suitable para-methylstyrenes contain at least about 90 weight percent of the para-isomer. Preferably, the para content is 95 percent or more, and most preferably 97 percent or more with less than about 0.1 percent of the meta-isomer. Para-methylstyrenes useful in this invention can be prepared by the conventional dehydrogenation of ethyl toluenes described in U.S. Pat. No. 4,086,287 to Kaeding et al which is incorporated herein by reference.

The polyols suitable for production of the reactive compositions can be hydroxyl-terminated polyesters, polyhydroxyalkanes, polyphenols, polyoxyalkylene polyols, or the like, having a molecular weight of about 500 and the corresponding mercapto derivatives. Such polyols are described in detail in U.S. Pat. No. 3,383,351 which is incorporated herein by reference.

Among the polyols which can be employed are one or more polyols from the following classes of compositions; minor amounts of polyhydroxyalkanes can be present:

(a) Hydroxy-terminated polyesters;
(b) Alkylene oxide of polyhydroxyalkanes;
(c) Trialkanolamines and alkylene oxide adducts thereof;
(d) Alcohols derived from mono- and polyamines by addition of alkylene oxides;
(e) Non-reducing sugars and sugar derivatives and alkylene oxide adducts thereof;
(f) Alkylene oxide adducts of aromatic amine/phenol/aldehyde condensation products;
(g) Alkylene oxide adducts of phosphorus and polyphosphorus acids;
(h) Polyphenols and alkylene oxide adducts thereof;
(i) Polytetramethylene glycols, and the like.

Illustrative alkylene oxide adducts of polyhydroxyalkanes include, among others, those adducts of ethylene glycol, propylene glycol, 1,3-dihydroxypropane, 1,3-dihydroxybutane, 1,4-dihydroxybutane, 1,4-, 1,5-, and 1,6-dihydroxyhexane, 1,2-, 1,3-, 1,4-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, xylitol, arabitol, sorbitol, mannitol, and the like having a molecular weight of at least 500; preferably the adducts of ethylene oxide, propylene oxide, epoxybutane, or mixtures thereof.

Two particularly suitable classes of alkylene oxide adducts of polyhydroxyalkanes are the ethylene oxide, propylene oxide, butylene oxide, or mixtures thereof, adducts of dihydroxyalkanes and of trihydroxyalkanes.

The reactive compositions are products by polymerizing the para-methylstyrene in the selected polyol at a temperature of from about 40° C. to 150° C. in the presence of a catalytically effective amount of a conventional free radical catalyst known to be suitable for the polymerization of ethylenically unsaturated monomers. The concentration of the catalyst can vary from about 0.001 to about 5 percent, preferably from about 0.2 to about 0.5 percent. However, any effective catalytic amount is satisfactory. Illustrative catalysts are the well-known free radical type of vinyl polymerization catalysts, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, and lauroyl peroxide.

The polymerization can also be carried out with an inert organic solvent present. Illustrative thereof are toluene, benzene, acetonitrile, ethyl acetate, hexane, heptane, dicyclohexane, dioxane, acetone, N,N-dimethylformamide, N,N-dimethylacetamide, and the like, including those known in the art as being suitable solvents for the polymerization of vinyl monomers. The only requirement in the selection of the inert solvent and the reactive solvent is that they do not interfere with the polymerization reaction. When an inert organic solvent is used, it is preferably removed by conventional means.

Additional monomers other than methylstyrenes can be present during the polymerization reaction. It is preferred that such monomers comprise a minor proportion of the monomer mixture relative to the methylstyrene. Suitable monomers are described in U.S. Pat. No. 3,383,351.

The polymer polyols can be converted into polyurethane and or polyisocyanurate resins and resin foams in the known manner by reaction with polyisocyanates.

The invention is illustrated by the following non-limiting examples.

EXAMPLE 1

This example illustrates the synthesis of a polymer polyol.

To a 3-necked, one liter flask equipped with nitrogen sparge, addition funnel, agitation shaft with half-moon blade, and reflux condenser, 321 g of a poly(oxypropylene) polyol is added. The polyol is heated to 115° C. with a Glas-col mantle while under oxygen-free nitrogen sparge. To this polyol a mixture containing 159 g of polyol, 120 g of para-methylstyrene, and 3.0 g of azobisisobutyronitrile is added at a uniform rate over a 2-hour interval. The temperature is maintained at 115° C. for 30 minutes after monomer addition is completed. Unpolymerized monomer is removed from the dispersion via a rotary evaporator at a pressure of less than 10 mm at approximately 100° C. The polymer polyol is stripped for 4 hours.

EXAMPLE 2

This example illustrates the preparation of a polyurethane foam using a polymer polyol in accordance with this invention.

The polymer polyol of Example 1, surfactant, and TDI in the proportions listed below, are weighed into an eight liter, baffled, stainless steel beaker and mixed 60 sec at 2000 rpm with two 2.5 in. 6-blade turbine stirrers, (blades placed 2.5 in. apart from base of shaft). The mixing is interrupted 15 sec to degas, mixed 5 sec, and a water amine catalyst solution added. The system is then mixed 5 sec, and stannous octoate catalyst is added. After an additional 5 sec mixing at 2000 rpm, the foam mixture is poured into a 24×24×20 in. paper-lined box. The foam is allowed to cure at ambient temperature overnight.

| Component | Parts by Wt. |
| --- | --- |
| Polymer polyol | 100 |
| Water | 3.5 |
| Surfactant (L-520) | 1.0 |
| Bis-(Dimethylaminoethyl)ether | 0.10 |
| Stannous octoate | 0.35 |
| Tolylene diisocyanate (TDI) (80/20 mixture of 2,4 and 2,6 isomers) | 35 |

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A polymer polyol product suitable for reaction with an isocyanate to form a polyurethane comprising the reaction product prepared under free-radical conditions from:
   (a) a minor proportion of a monomer comprising at least 85 weight percent para-methylstyrene; and
   (b) a major proportion of a polyol containing sites for grafting of said p-methylstyrene under said reaction conditions.

2. The polymer polyol of claim 1 in which said monomer comprises at least about 95 weight percent para-methylstyrene.

3. The polymer polyol of claim 1 in which said polyol (b) is an alkylene oxide adduct of a polyhydroxyalkane.

4. The polymer polyol of claim 2 in which said alkylene oxide is ethylene oxide or propylene oxide.

5. The polymer polyol of claim 2 in which said polyhydroxyalkane is a di- or tri-hydroxyalkane.

6. A polyurethane composition comprising the reaction product of the polymer polyol of claim 1 and a polyisocyanate.

* * * * *